(12) United States Patent  (10) Patent No.: US 8,169,422 B2
Flachsbart  (45) Date of Patent: May 1, 2012

(54) FINGERNAIL STYLUS FOR PDA USE

(76) Inventor: Erin Flachsbart, Chicago, IL (US)

( * ) Notice: Subject to any disclaimer, the term of this patent is extended or adjusted under 35 U.S.C. 154(b) by 1047 days.

(21) Appl. No.: 11/891,640

(22) Filed: Aug. 10, 2007

(65) Prior Publication Data

US 2008/0117189 A1    May 22, 2008

Related U.S. Application Data

(60) Provisional application No. 60/836,770, filed on Aug. 10, 2006.

(51) Int. Cl.
*G09G 5/00*    (2006.01)

(52) U.S. Cl. .......................... 345/179; 345/157

(58) Field of Classification Search ................... 345/179, 345/156, 157; 401/8
See application file for complete search history.

(56) References Cited

U.S. PATENT DOCUMENTS

| | | | | |
|---|---|---|---|---|
| 6,249,277 B1 * | 6/2001 | Varveris | | 345/179 |
| 2005/0093835 A1 * | 5/2005 | Mortarelli | | 345/179 |
| 2006/0066563 A1 * | 3/2006 | Mochwart | | 345/156 |

* cited by examiner

*Primary Examiner* — Kevin M Nguyen

(74) *Attorney, Agent, or Firm* — Clifford Kraft

(57) ABSTRACT

A finger stylus for attachment to a fingernail for manipulation of a handheld device such as a PDA that can include a base with an adhesive on a lower surface for attaching the stylus to a fingernail and an elongated part coupled to an upper surface where the elongated part points outward at an angle from the base. The finger stylus of the present invention can be a disposable device that can be of plastic or rubber.

9 Claims, 4 Drawing Sheets

FIG. 3a
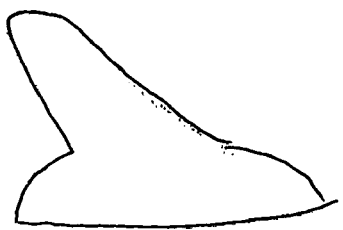
FIG. 3c
FIG. 3b

FINGERNAIL STYLUS FOR PDA USE

This application is related to and claims priority to U.S. Provisional Patent Application No. 60/836,770 file Aug. 10, 2006. Application No. 60/836,770 is hereby incorporated by reference.

BACKGROUND

1. Field of the Invention

The present invention relates generally to the field of computer and PDA accessories and more particularly to a fingernail stylus for manipulation of a PDA or similar handheld device.

2. Description of the Prior Art

PDAs and similar handheld devices typically are equipped with touch screens and/or very small keys. These devices allow data entry with a supplied pencil or other device. It would be advantageous to have a finger stylus that could be used to manipulate and enter data into a PDA. Such a device should be easy to attach to a fingernail and possibly be disposable.

SUMMARY OF THE INVENTION

The present invention relates to a finger stylus for attachment to a fingernail for manipulation of a handheld device such as a PDA. The present invention can include a base with an adhesive on a lower surface for attaching the stylus to a fingernail and an elongated part where the elongated part points outward at an angle from the base. The finger stylus of the present invention can be a disposable device of plastic or rubber.

DESCRIPTION OF THE FIGURES

FIGS. 3a, 3b and 3c show several different possible shapes the present invention may take.

Several illustrations and drawings have been presented to better aid in the understanding of the present invention. The scope of the present invention is not limited to what is shown in the figures.

DESCRIPTION OF THE INVENTION

The present invention relates to a stylus that can be attached to a fingernail and used to manipulate and enter data into a PDA or other handheld device. FIG. 1 shows an embodiment of the present invention mounted on a fingernail in both a forward pointing direction and a backward pointing direction. The stylus can be disposable and be attached to a fingernail or fake using adhesive or by any other method of attaching it. It can optionally be part of a fake fingernail. The device sticks to the fingernail in a manner that still allows the user to type or hold a pen without interference. FIG. 2 shows a top view of a forward pointing embodiment of the invention.

Figures 1A, 1B:
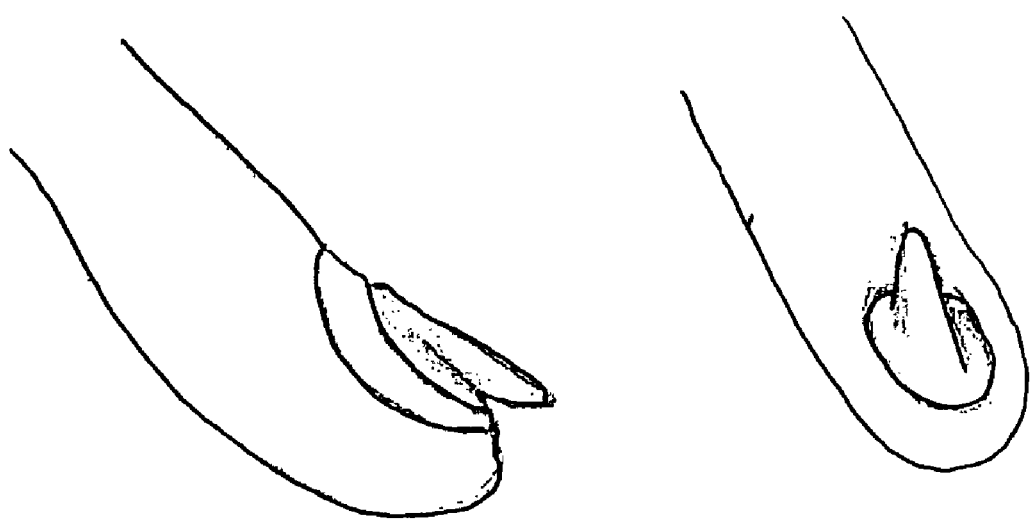
FIGS. 1a-1b show an embodiment of the present invention mounted both forward pointing and backward pointing.
Figure 2:
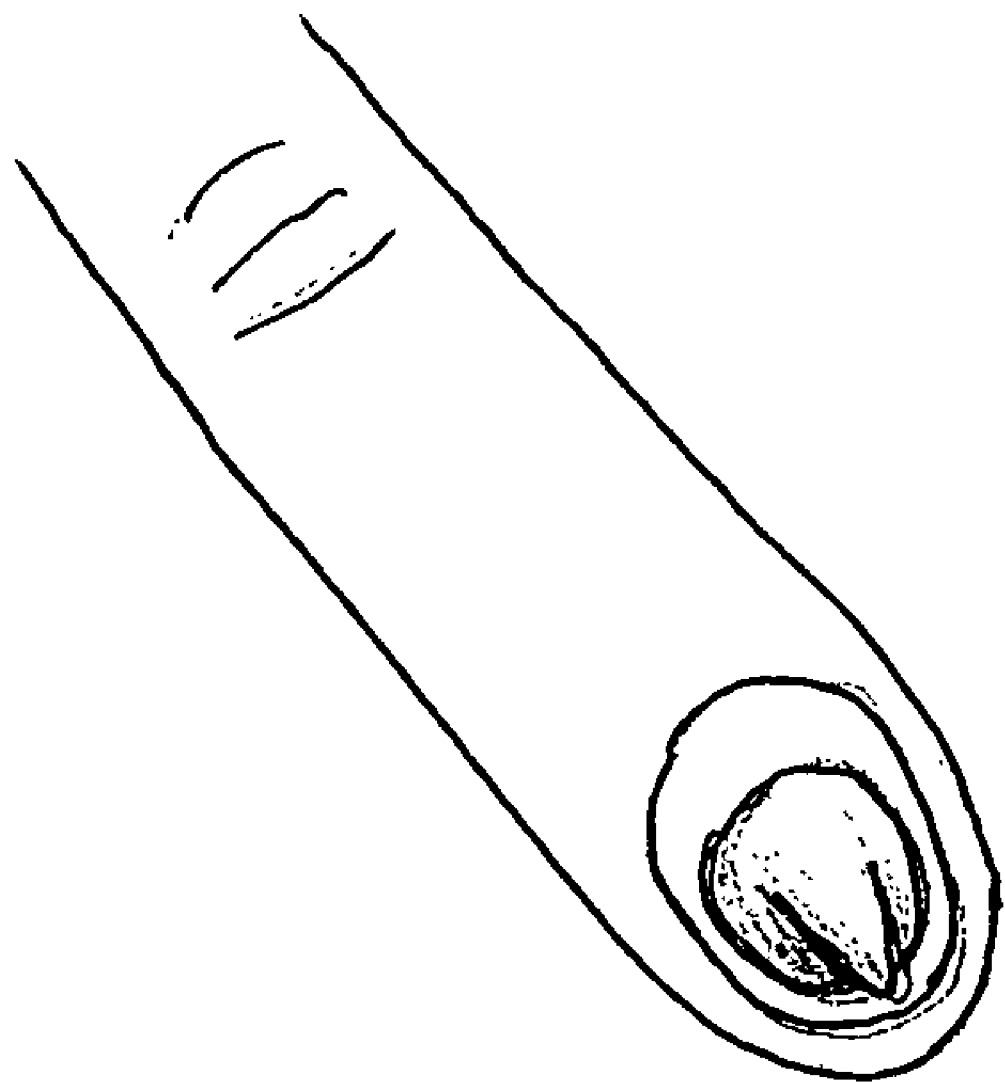
FIG. 2 shows a top view of the embodiment of FIG. 1 mounted in a forward pointing mode.

The base of the stylus can be round or oval so that it can be turned in any direction as can be seen from the examples in FIGS. 1a and 1b and FIG. 2. The stylus can work no matter which way the user slants the finger. For example, the stylus can work with the finger turned up, down or sideways. The present invention can be placed in any position on the fingernail, and in particular can be placed in an optimum position for a particular nail considering the factors of nail length and/or size of the finger.

The stylus of the present invention can be made of any semi-rigid material and can come in varying colors, tip angles and lengths. FIGS. 3a-3c show examples of possible tip shapes and angles. The preferred material for the stylus is rubber or plastic.

Figure 4:
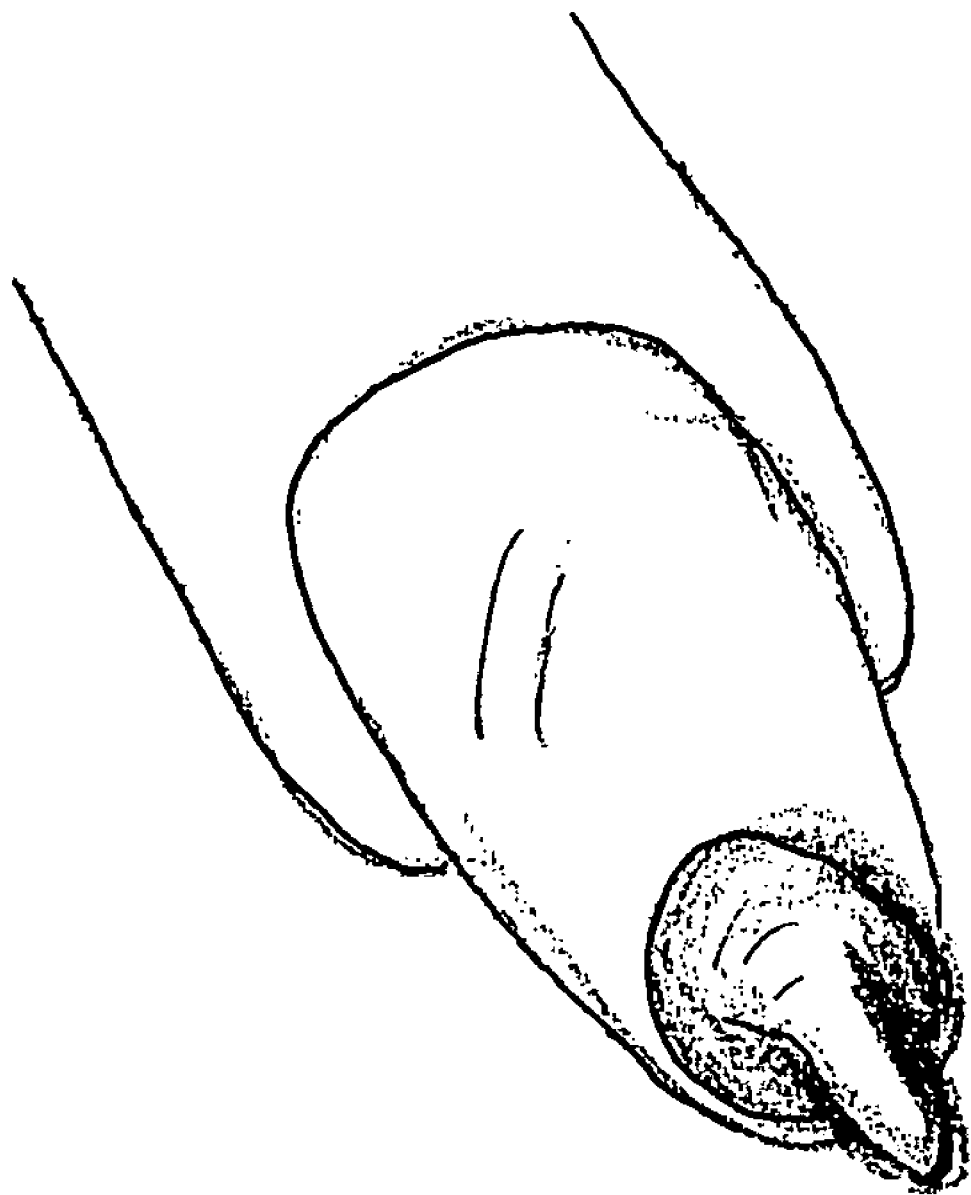
FIG. 4 shows an embodiment of the present invention attached to a long or fake nail.

FIG. 4 shows an example of the present invention attached to a long or fake nail.

Several descriptions and examples have been given to better aid in the understanding of the present invention. One skilled in the art will realize that many changes and variations are possible. Each of these changes or variations is within the scope of the present invention.

I claim:

1. A finger stylus for attachment to a fingernail for manipulation of a handheld device such as a PDA comprising a disposable fake fingernail having a base with adhesive on a lower surface, wherein said lower surface of said base makes contact with said fingernail's upper surface, and wherein said adhesive attaches said fake fingernail to the fingernail; said stylus also having an elongated part coupled to an upper surface of said base, said elongated part pointing outward at an angle from said base and upward and away from said fingernail.

2. The finger stylus of claim 1 wherein said device is plastic.

3. The finger stylus of claim 1 wherein said device is rubber.

4. The finger stylus of claim 1 wherein said elongated part points in a direction of said fingernail.

5. The finger stylus of claim 1 wherein said elongated part points in a direction opposite to said fingernail.

6. A disposable fake fingernail for attachment to a fingernail for manipulating keys on a handheld device comprising a base with adhesive on a lower surface mounting to said fingernail, and an elongated member protruding from a front part of an upper surface, said elongated member pointing upward and away from said fingernail.

7. The apparatus of claim 6 wherein said apparatus is plastic or rubber.

8. The apparatus of claim 6 wherein said elongated member points in a direction of said fingernail.

9. The apparatus of claim 6 wherein said elongated member points in a direction opposite to said fingernail.

* * * * *